Oct. 6, 1936.                    J. WAHL                    2,056,754
                              PRESSURE GAUGE
                         Original Filed Aug. 2, 1930
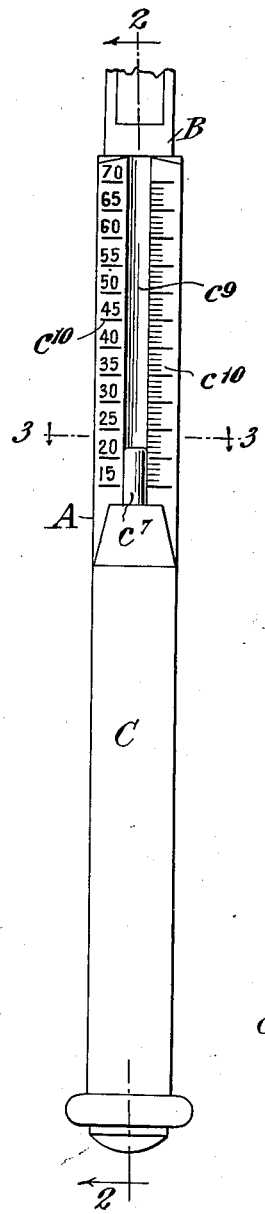
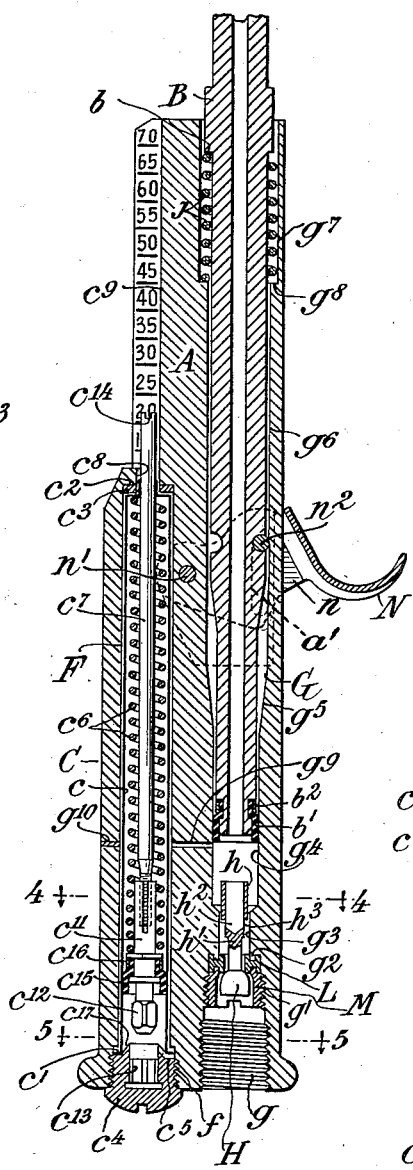
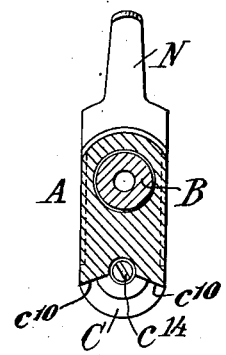
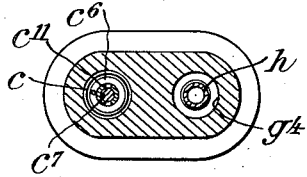
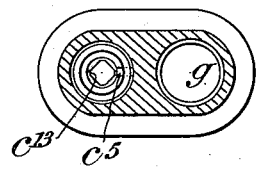
INVENTOR
John Wahl,
BY
Fraser, Myers & Manley
ATTORNEYS.

Patented Oct. 6, 1936

2,056,754

UNITED STATES PATENT OFFICE 2,056,754

PRESSURE GAUGE

John Wahl, Rosedale, N. Y., assignor to A. Schrader's Son, Incorporated, New York, N. Y., a corporation of New York Original application August 2, 1930, Serial No. 472,726. Divided and this application September 14, 1933, Serial No. 689,405

4 Claims. (Cl. 73—111)

This invention relates to pressure gauges for pneumatic tires and the like and aims to provide certain improvements therein, and constitutes a division of my co-pending application, Serial No. 472,726, filed August 2, 1930, and which has materialized into a patent, No. 1,933,610, November 7, 1933.

An object of the present invention is to provide a device of the character described having provision for adjusting the zero point of the gauge after the parts thereof have been assembled. A further object is to accomplish this without the addition of any external projecting parts. A further object is to accomplish this by the provision of means for varying the effective length of the indicating member of the gauge. A still further object is to provide a gauge wherein the indicating member projects from the casing when in indicating position, it will be protected against injury should the gauge be accidentally dropped or brought into violent engagement with another object.

The foregoing and other objects of my invention will be better understood from the detailed description which follows, when considered in conjunction with the accompanying drawing wherein I have shown the gauge mounted in assembled relation with an inflating device.

In the drawing:—

Figure 1 is a top plan view of the gauge in combination with an inflating device, the air chuck of said device being omitted.

Fig. 2 is a longitudinal section taken substantially along the plane of the line 3—3 of Fig. 1.

Fig. 3 is a transverse section taken substantially along the plane of the line 3—3 of Fig. 1.

Fig. 4 is a transverse section taken substantially along the plane of the line 4—4 of Fig. 2.

Fig. 5 is a transverse section taken substantially along the plane of the line 5—5 of Fig. 2.

Referring to the drawing, which shows the invention as embodied in a combined air chuck and gauge in the form of a portable instrument, let A indicate an elongate body member having a coupling member or stem B and a pressure gauge C housed therein.

The body member A is preferably of oblong cross-section and is formed with bores F and G extending longitudinally therethrough. The bore F houses the pressure gauge C, the details of which will be presently described. The bore G is of various diameters and accommodates the stem B which is slidable therein, and a valve H which controls the passage of fluid through said bore. The bore G at its rear end is enlarged and internally threaded, as shown at $g$, said thread being adapted for connection with a hose fitting (not shown) leading to the source of fluid pressure. Inwardly of said bore $g$ is a bore of somewhat reduced diameter $g'$ which terminates in a shoulder $g^2$ provided between said bore $g'$ and a bore of smaller diameter $g^3$. Further inwardly from the bore $g^3$ the bore G is again enlarged, as shown at $g^4$, and then tapers outwardly, as shown at $g^5$ to provide the bore portion $g^6$ of somewhat larger diameter. The latter bore is again enlarged, as shown at $g^7$, and extends to the forward end of the body member and provides a shoulder $g^8$ with the bore $g^6$. A duct $g^9$ establishes communication between the bore F and the portion $g^4$ of the bore G, said duct being provided by a drilling operation from the exterior of the body portion, the outer portion of said drilled hole being sealed with a plug $g^{10}$.

The stem B, which is hollow, is mounted for limited sliding movement within the bore G and is normally held in the position shown in Fig. 2 through the medium of a spring J, one end of which bears against the shoulder $g^8$ and the other end against a shoulder $b$ on the stem. The stem at its inner end is reduced in diameter and has mounted thereon a plunger cup $b'$ which is held in clamping relation on the stem by a ferrule $b^2$. The plunger cup $b'$ provides a packed fit with the bore portion $g^4$, and in the normal position of the stem B uncovers the duct $g^9$. The end of the stem B, which normally projects outwardly beyond the body portion A, is adapted for connection with an inflating chuck (not shown) which may be either directly connected to said projecting end or may be connected thereto by a hose (not shown).

Mounted on the shoulder $g^2$ is a packing washer L which is held in position by an externally threaded nipple M engaging in the screw-threaded bore $g'$. The valve H has an enlarged inner end $h$ and a reduced intermediate stem $h'$ and is normally held seated upon the packing L by the fluid pressure from the source or tank. When unseated by the stem B, it is guided within the bore $g^3$ by the inner end $h$ which is counterbored, as shown at $h^2$, and has its faces shaved off, as shown at $h^3$, to permit the passage of the pressure fluid therethrough.

As a practicable and convenient means for moving the stem B against the action of the spring J, I provide a trigger N, which, as herein shown, is formed from a sheet metal stamping, having upwardly-extending arms $n$ which straddle the sides of the body member A to which they are pivoted, by means of a pin $n'$. To provide a construction free from obstructions, the faces of the body portion A are grooved or depressed, to a depth such that the upwardly bent arms $n$ of the trigger member will lie flush with the outer surfaces of the body portion A. Carried by the stem B is a transverse pin $n^2$ which projects through elongate slots $a'$ in the opposite sides of the body member and through openings (not shown) in the opposite arms $n$ of the trigger, the ends of said pin being upset over the outer faces of the arms of the trigger to prevent the separation of the members, all of which is shown in detail in my patent hereinbefore mentioned.

The gauge device C comprises a cylindrical tube $c$, one end of which is flared outwardly as shown at $c'$, and the other end of which is turned inwardly and then axially outwardly, as shown at $c^2$, said end $c^2$ being held in leak-tight engagement with a packing washer $c^3$ in the inner end of bore F through the medium of a locking screw $c^4$ which is threaded into the internally screw-threaded end $f$ of the bore F. The sleeve $c$, which constitutes the gauge cylinder, has an outer diameter slightly less than that of the bore F to provide an air passage which communicates with the duct $g^9$. To permit the passage of fluid from the space around the cylinder $c$ into the cylinder, the inner end of the locking screw $c^4$ is grooved, as indicated at $c^5$. The gauge comprises a piston, a spring $c^6$ for resisting outward movement of the piston under fluid pressure, and an indicating member $c^7$ which is projectable through an opening $c^8$ in the body member leading from the bore F. In alignment with the bore $c^8$ is a groove $c^9$ in the top face of the body member, which groove is flanked by oppositely inclined, flat faces $c^{10}$ upon which pressure indicia are provided.

It is desirable that the gauge be of a construction which will permit of the adjustment thereof so as to accurately set the zero point thereon after the gauge parts are assembled. To accomplish this the indicating member $c^7$ may be said to consist of two parts which are screw-threadedly connected together so that the effective length of the member may be varied. As herein shown, the inner part of the indicating member is in the form of a split sleeve $c^{11}$ which is internally screw-threaded for cooperation with the externally screw-threaded end of the part $c^7$, the split sleeve serving as a resilient means for holding the threaded parts in set relation. To vary the effective length of the indicating member after the gauge parts are assembled, it will be appreciated that one of the screw-threaded members will have to be held stationary while the other is rotated. This I accomplish by providing the inner end of the member $c^{11}$ with a squared stud $c^{12}$ and forming the locking screw $c^4$ with an internally squared cavity $c^{13}$ adapted to receive the end $c^{12}$ and hold it against rotation while the part $c^7$ is rotated. To rotate the part $c^7$, the outer end thereof is provided with a kerf $c^{14}$ for engagement with a screw driver or the like. The gauge piston is formed by a cupped packing $c^{15}$ which is held between a pair of ribs on the member $c^{11}$ by a ferrule $c^{16}$. For insuring effective engagement between the packing $c^{15}$ and the inner wall of the tube $c$, said packing is normally forced over an expanding cone $c^{17}$ formed on the inner end of the locking screw $c^4$.

Although I have herein shown the gauge as forming part of the combined coupling and gauge, and the cylinder of the gauge as adapted to receive the pressure to be tested through the ducts $g^9$, the space between the cylinder $c$ and the bore F, and the groove $c^5$ in the locking screw $c^4$, it will be appreciated that the gauge device may be provided with a conventional press-on foot and thereby constitute a pressure gauge as a separate and distinct entity.

What I claim is:

1. A pressure gauge comprising an elongate body having a bore therein, an indicating device movable in said bore and extensible through one end thereof, said device being comprised of adjustable connected sections, the adjustable connection being disposed within the bore and permitting adjustment of the effective length of the indicating device by manipulation of the outer end of the indicating device after the gauge parts are completely assembled.

2. A pressure gauge comprising an elongate body portion having a cylindrical bore, pressure responsive means in said bore comprising a piston, a spring resisting outward movement of the piston, and an indicating device connected to said piston and movable through one end of the bore, said indicating member being formed of two screw-threaded parts, and means within the gauge for holding one of said indicating member parts stationary while the other part is rotated from the exterior of the gauge to vary its effective length.

3. A pressure gauge comprising an elongate body portion having a cylindrical bore, pressure response means in said bore comprising a piston, a spring resisting outward movement of the piston, and an indicating device connected to said piston and moveable through one end of the bore, said indicating member being formed of two screw-threaded parts, a closure member at one end of the bore, and cooperative means on said member and on the inner end of said indicating member parts for holding the latter stationary while the outer part is rotated from the exterior of the gauge to vary the effective length of the indicating member.

4. A pressure gauge comprising an elongate body portion having a cylindrical bore, pressure responsive means in said bore comprising a piston, a spring resisting outward movement of the piston, and an indicating device connected to said piston and movable through one end of the bore, said indicating member being formed of two screw-threaded parts, one of which is longitudinally split to provide a resilient holding engagement between the threaded parts, a closure member at one end of the bore, and cooperating means on said member and the inner end of said indicating member parts for holding the latter stationary while the outer part is rotated from the exterior of the gauge to vary the effective length of the indicating member.

JOHN WAHL.